United States Patent
Rommes

(10) Patent No.: US 6,837,662 B2
(45) Date of Patent: Jan. 4, 2005

(54) DEVICE AND METHOD FOR HANDLING MOLDED ARTICLES

(75) Inventor: Luc Rommes, Eischen (LU)

(73) Assignee: Husky Injection Molding Systems Ltd. (CA)

( * ) Notice: Subject to any disclaimer, the term of this patent is extended or adjusted under 35 U.S.C. 154(b) by 29 days.

(21) Appl. No.: 10/319,075

(22) Filed: Dec. 13, 2002

(65) Prior Publication Data

US 2004/0115033 A1 Jun. 17, 2004

(51) Int. Cl.[7] ............................................. B65H 1/00
(52) U.S. Cl. ............................. 414/226.01; 198/468.3; 198/374; 414/798.4; 414/800; 414/910
(58) Field of Search ................... 414/222.01, 225.01, 414/226.01, 791.6, 791.7, 792.5, 798.2, 798.4, 910, 800, 806; 198/468.3, 374, 434; 206/139

(56) References Cited

U.S. PATENT DOCUMENTS

| | | |
|---|---|---|
| 3,802,154 A | 4/1974 | Dillon |
| 3,878,665 A | 4/1975 | Couten |
| 4,261,949 A | 4/1981 | Spurr et al. |
| 4,915,611 A | 4/1990 | Brown |
| 5,555,706 A * | 9/1996 | Maoloni et al. ............. 53/447 |
| 6,186,736 B1 * | 2/2001 | Lust et al. ................. 414/800 |

* cited by examiner

*Primary Examiner*—Donald W. Underwood
(74) *Attorney, Agent, or Firm*—Katten Muchin Zavis Rosenman

(57) ABSTRACT

Non-symmetrical molded articles, such as large preforms, are handled by a handling system into which an array of molded articles are transferred from a mold having a pitch separation The handling system has an arranging station configured to receive and align a first set of molded articles, which arranging station is further configured to receive and align a second set of molded articles in an opposingly orientated direction to the first set. To reduce the pitch separation, the arranging station includes a closure mechanism that brings together the first and second sets of molded articles in a substantially linear array. Once in the linear array, a handling device operates to pick up and crate the linear array of preforms. Transfer and pick-up of the preforms can be accomplished using a multi-function, multi-axis robot that supports take-out tubes and suction pads.

46 Claims, 4 Drawing Sheets

DEVICE AND METHOD FOR HANDLING MOLDED ARTICLES

BACKGROUND OF INVENTION

1. Field of the Invention

The present invention relates, in general, to a handling device and a method for handling elongate molded articles, and is particularly, but not exclusively, applicable in a system for handling large injection molded preforms, e.g. elongate preforms that are subsequently blow-molded into 10 to 25-liter water bottles.

2. State of the Art

To date, there has been a tendency for large beverage containers and the like, e.g. the aforesaid 10 to 25-liter water bottles, to be manufactured in polycarbonate in an extrusion manufacturing process. Polycarbonate is however relatively soft and therefore susceptible to surface damage, e.g. scratching, and its manufacturing process is generally costly.

Recently there has been a general movement and desire to produce such large containers in polyethylene tetraphthalate (PET), especially since the processing of PET can be performed in an injection molding environment and, besides increased ease of recycling of the molded article and increased resilience to scratching, the optical quality of PET injection molded articles is generally better than corresponding polycarbonate articles. Furthermore, the injection molding process also yields molded articles having repeatably attainable, highly-toleranced physical dimensions which therefore ensures enhanced part quality. In the manufacture of injection molded articles, e.g. in the context of preforms for food and beverage applications and the like, an injection molding machine can support a mold with multiple mold cavities so that a number of articles can be molded in a single molding cycle. For large or heavyweight preforms, generally considered to weigh in excess of about 100 g, and typically more, a mold configuration may be laid out as two columns of eight preforms. Large or heavyweight preforms often have lengths dimensions generally in excess of about 20 cm, and diameters of about 5 cm. For smaller preforms, mold cavitation sizes are considerably smaller and accordingly the number of mold cavitations can be considerably larger, with manufacturers presently offering systems with up to 144 cavities. After the plastics melt has been injected into the mold cavities, the mold must remain shut, to allow sufficient solidification of the melt into the article to allow handling of the article without causing meaningful deformation.

The number of preforms formed in an injection molding cycle depends on the number of injection mold cavities, with the number of cavities also dependent upon the plastic volume throughput per cycle of the extruder and injection unit. For very heavyweight preforms, e.g. preforms for 10 to 25-liter bottles, injection molding machines typically support cavitations of between about 1 to 8 cavities, although other cavitations are possible, subject to machine tonnage, extruder throughput and cycle time. The cavities, for optimized cooling purposes, are generally aligned in parallel columns of cavities, with all cavities in adjacent columns also aligned in a horizontal plane to form a symmetrical rectangular array. Of course, adjacent parallel columns could have their respective cavities offset or staggered.

The cycle time of such an injection molding process varies according to the size of the molded article being manufactured, with smaller articles, e.g. preforms suitable for blowing into 500 ml bottles, requiring less time to inject and sufficiently solidify than larger articles, such as preforms designed to be blown into 10 to 25-liter water bottles, which can have preforms weights of about 500 to 700 although larger (heavier) preforms are also being considered. Essentially, the cycle time is related to the mass and thermal dissipation characteristics of the molded article, with thicker preforms having better insulative properties arising from the poor thermal transfer characteristics of plastics, particularly PET and PEN (polyethylene). Once the articles have solidified sufficiently to allow handling, the mold is opened and the articles are ejected from the mold. European patent EP describes the use of intimate fit cooling tubes for removing molded articles, such as preforms, from the mold and delivering them to a conveyor system.

Generally, the articles are dropped from the injection mold or the cooling tubes onto a conveyor, which then transports the articles and drops them into a shipping crate. It has, however, been noted that, when the articles are ejected from the cooling tubes, they are prone to damage and deformation; this is particularly true for larger articles such as preforms for 10 to 25-liter water bottles. Damage, such as surface scratching, can also occur and be accentuated when the articles are loaded into shipping crates or the like. Furthermore, from a logistical movement perspective, it is desirable to load the molded articles into shipping crates in an efficient and compact way to optimize the number of articles in each crate.

SUMMARY OF INVENTION

To overcome the abovementioned problems, the present invention proposes a handling device comprising a combination of a robot and an arranging station, in particular for handling large injection molded articles,wherein the handling device comprises:—means for transferring an array of articles from a mold to said arranging station, said mold having a pitch separation;—means for receiving and aligning a first set of articles of said array;—means for receiving and aligning a second set of articles of said array;—means for orientating said second set of articles relative to said first set of articles such that said second set of articles are orientated in an opposing direction to said first set of articles;—means for grouping said first set and said second set of articles together in a linear array, said means for grouping being able to reduce the pitch separation between adjacent articles;and wherein said robot comprises:—transport means configured to pick up said linear array for subsequent delivery and deposition.

By means of the combination of robot means and arranging station, the handling device allows the safe handling of articles, in particular of large injection molded preforms. The articles are carefully placed on the arranging station, where they are aligned and orientated such that they are positioned in a linear array of articles arranged in opposite directions. The pitch separation between adjacent articles can be reduced or eliminated. The aligned and orientated articles can then be carefully transported to a shipping crate or the like. Damage to the articles through rough handling, e.g. dropping of the articles onto a conveyor, is avoided. Furthermore, a closer packaging arrangement allows a more efficient packaging of the articles.

The present invention also concerns a handling device for handling molded articles, in particular large injection molded preforms, received from a molding machine. The handling device comprises a first longitudinal receiving plate for receiving a first end of at least one article and a second longitudinal receiving plate for receiving a first end of at least one article. The receiving plates each comprise at least one holder for holding the articles on the receiving plates. The first receiving part has a first pivot axis and the second receiving part has a second pivot axis substantially parallel to the first pivot axis. The handling device further comprises an actuator for pivoting the first and second receiving plates about their respective pivot axis so as to bring the articles side-by-side between the receiving plates.

The handling device receives the articles withdrawn from a molding machine. The handling device then securely aligns the articles side-by-side in both the longitudinal and transverse directions. The holders securely hold the articles on the receiving plates and ensure that the articles cannot fall off the receiving plates when the latter is pivoted. The articles are not, as in prior art devices, vertically dropped onto a conveyor and then allowed to fall into a collection/transit crate. The present invention thereby reduces or substantially eliminates the potential damage to the articles incurred in transit packing by vertically receiving the articles and carefully bringing them in a horizontal position by means of the pivoting rotation of the receiving plates, whereafter a robot can place the aligned and closely-packed preforms into a shipping crate.

Furthermore, the disposition of the receiving plates allows the handling device to place the articles next to each other while one article points in one direction and the other article points in the opposite direction. By arranging the articles so that they point in opposite directions, they can be more closely packaged. Space is hence saved, which means that more articles can be arranged side by side in a shipping crate or the like.

Preferably, the first receiving plate comprises a first row of holders for receiving a first row of articles, and the second receiving plate comprises a second row of holders for receiving a second row of articles. Advantageously, the holders are arranged on each receiving plate such that, when the articles are placed on the holders, a gap of at least the width of an article exists between two adjacent articles. As the receiving plates are pivoted, the articles from one receiving plate can then engage in the gap between the articles from the other receiving plate.

A suitable drive allows for longitudinal displacement of one receiving plate relative to the other. This allows the bringing of the articles of one receiving plate into a staggered relationship with respect to the articles of the other receiving plate. It is also possible to displace both receiving plates in opposite directions. The actuator would then, e.g., comprise two facing toothed racks, one associated with each receiving plate, and a gearwheel engaging the toothed racks. Such a gear mechanism provides a very simple means for transmitting movement of one receiving plate in a first direction to a movement of the other receiving plate in the opposite direction. It will be understood that there is no need to longitudinally displace the receiving plates with respect to each other if the two rows of articles emerge from the molding machine in a staggered relationship.

According to one embodiment of the invention, the holders are pegs mounted on the receiving plates, wherein the pegs are dimensioned so as to engage a first end of the articles. Articles, such as preforms, can be placed with their open end onto the pegs. The latter engage in the open end of the article far enough so as to avoid the article falling off the respective receiving plate when the latter is pivoted. In order to release the articles from the pegs, after pivoting the receiving plates, release means are operated to free the articles.

The handling device can further comprise alignment means for aligning and/or bringing together the articles after they have been released from the receiving plates. Such alignment means can e.g. be a first pair of pusher bars for aligning the articles in their longitudinal direction and a second pair of pusher bars for aligning the articles in their transverse direction. The second pair of pusher bars can also be used to bring the articles closer together and thereby achieve a more compact arrangement. Any actuator means can be used to operate the pusher bars.

The handling device of present invention can also comprise a robot for transferring the articles from a mold of the molding machine to the receiving plates. Such a robot can comprise a take-out plate for receiving the articles from a mold and a robot arm for operating the take-out plate so as to transfer the articles from the mold onto the first and second receiving plates.

The robot arm preferably has six degrees of freedom. Such a robot arm can move the take-out plate along any path between the injection mold and the handling device. It is thereby possible to avoid any obstacles that might be present.

The present invention also concerns a method for handling injection molded articles, in particular for handling large injection molded preforms, comprising the steps of: receiving the articles in a take-out plate and operating the take-out plate so as to place at least one article onto a first longitudinal receiving plate and at least one article onto a second longitudinal receiving plate, the first and second receiving plates each comprising at least one holder for holding the articles on the receiving plates, the first and second receiving plates having substantially parallel pivot axis; and pivoting the first and second receiving plates about their respective pivot axis, the first and second receiving plates being pivoted so as to bring the articles side-by-side between the receiving plates.

The method allows alignment of the articles side-by-side in both longitudinal and transverse directions. Generally, the articles are vertically placed on the receiving plates and then brought in a horizontal position by pivoting the receiving plates. The articles are not, as in prior art devices, vertically dropped onto a conveyor, where they fall over into a horizontal position, thereby causing damage to the articles. The present method hence allows to avoid damage to the articles.

Furthermore, the disposition of the receiving plates allows the articles to be placed next to each other while one article points in one direction and the other article points in the opposite direction. By arranging the articles so that they point in opposite directions, they can be more closely packaged. Space is hence saved as optimized packing ensures that more articles can be packed per unit volume of shipping crate or the like.

BRIEF DESCRIPTION OF DRAWINGS

Exemplary embodiments of the present invention will now be described with reference to the attached drawings, wherein.

DETAILED DESCRIPTION

Figure 1:
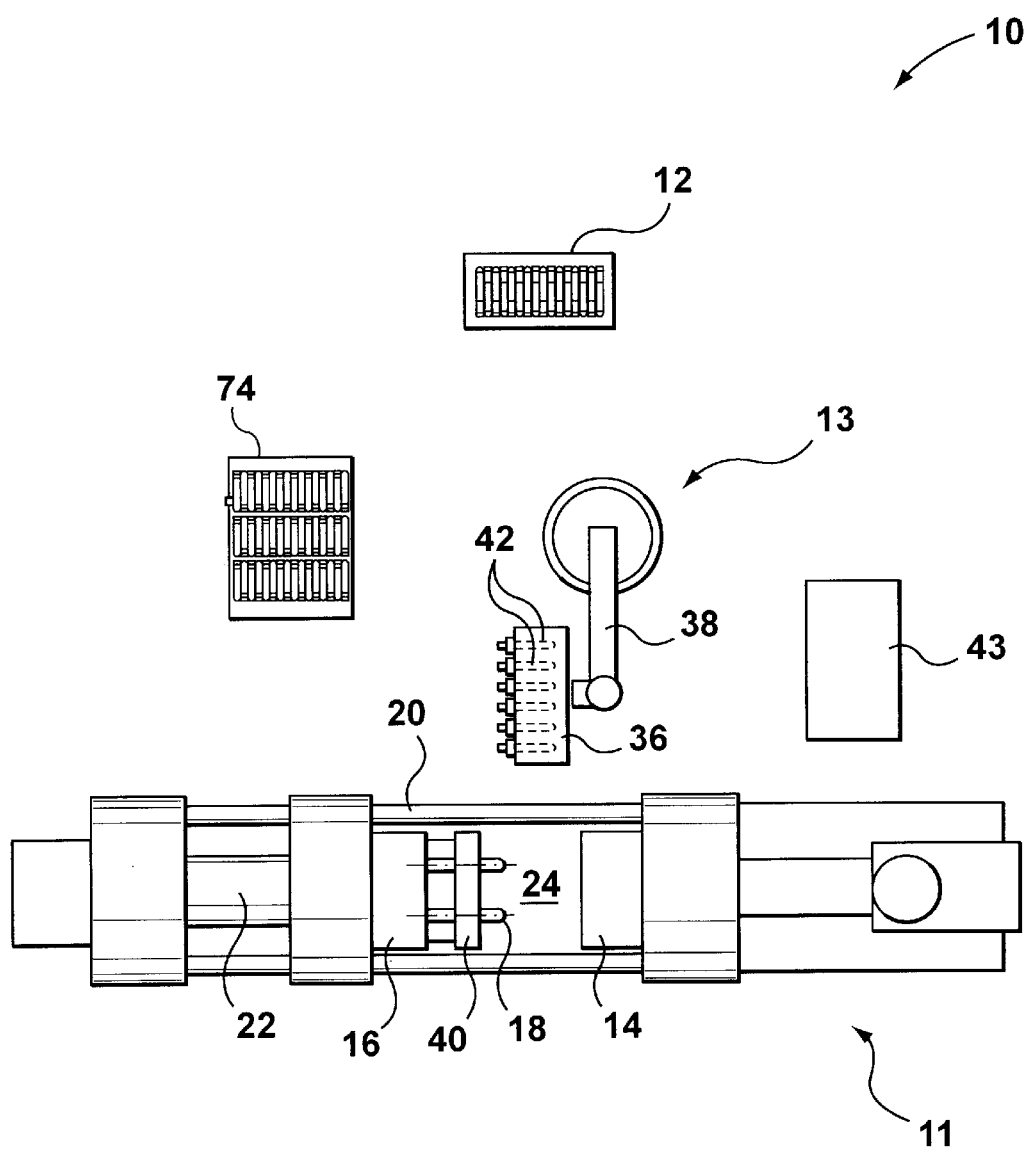
FIG. 1 is a schematic top view of an injection molding system arranged to package or crate-up articles according to a first embodiment of the invention.

FIG. 1 shows an injection molding system 10 for producing and packing elongate molded articles and especially large-sized or heavyweight preforms produced by an injection molding machine 11. FIG. 1 shows the injection molding machine 11 and a handling device comprising an arranging station 12 and a handling robot 13 for transferring the preforms from the injection molding machine 11 to the arranging station 12.

The injection molding machine 11 comprises a first mold half 14 with a plurality of cavities therein and a second mold half 16 with a plurality of elongate cores 18 thereon. The number of cores 18 on the second mold half 16 corresponds to the number of cavities in the first mold half 14. The first and second mold halves are mounted on respective platens which, during operation, are closed and clamped together under an applied tonnage clamp force, e.g. by co-operation of tie-bars 20 and a hydraulic cylinder 22. FIG. 1 shows the first and second mold halves 14, 16 in a mold-open position, wherein a gap 24, suitable to accommodate a take-out plate 36, is formed between the mold halves 14, 16 held within their respective platens.

In the mold-closed position, the elongate cores 18 of the second mold half 16 engage in respective cavities of the first mold half 14 to form an injection mold cavity. Plastic material is injected into the injection mold cavity by known injection molding procedures. After injection of the plastic material, the mold portions 14, 16 remain in the mold-closed position until the plastic material has sufficiently solidified to allow handling of the preforms without causing meaningful deformation. The mold portions 14, 16 can then be moved into the mold-open position to allow removal of the preforms from the elongate cores 18 of the second mold half 16.

Referring back to FIG. 1, the handling robot 13 removes freshly molded preforms from the cores and delivers the removed preforms to an arranging station 12. The handling robot 13 comprises a take-out plate 36 mounted on a free end of a robot arm 38. The robot arm 38 is preferably configured to have six degrees of freedom to provide full movement capabilities for the take-out plate 36. The robot arm 38 can be implemented using, for example, linear actuators, although other drive mechanisms are possible. When the mold halves 14, 16 in the injection molding machine 10 are separated in the mold-open position, the robot arm 38 moves the take-out plate 36 into the gap 24 between the mold portions 14, 16 and positions the take-out plate 36 to receive a set of preforms from the mold portions 14, 16. The transfer of the preforms onto the take-out plate 36 is preferably accomplished by the use of a stripper plate 40 associated with the second mold half 16, which stripper plate physically engages and mechanically ejects the preforms form the cores, as will be understood.

The take-out plate 36 is preferably arranged to accentuate cooling of the preforms while they are being transported to the arranging station 12. The take-out plate 36, in a preferred embodiment, therefore comprises a set of water cooled cooling tubes 42, coupled to the take-out plate, for receiving the freshly molded preforms therein. Such water-cooled and/or intimate fit cooling or take-out tubes 42 are described in U.S. Pat. No. 4,729,732 (incorporated by reference herein). Alternatively, to reduce weight of the take-out plate, the take-out tubes 42 could be realized as holders having a basic skeletal structure conforming to the shape and size of the ejected preform.

Preferably, as discussed in European patent EP(the disclosure of which is hereby incorporated by reference), the take-out plate 36 comprises at least two sets of cooling tubes 42 such that the number of cooling tubes 42 in the take-out plate 36 corresponds to an integer multiple of at least twice the arrangement of cavities of first mold half 14.

With the use of a multi-axis robot, molded articles retained temporarily in the take-out plate 36 can be maneuvered and hence delivered to, or positioned relative to, one or more intermediate processing stations, or post-mold processing stations. FIG. 1 illustrates (for reasons of clarity only) only one such intermediate processing station 43 which, for the sake of explanation, is an intermediate cooling station. It will be appreciated and understood that a variety of complementary or different intermediate processing stations can be stacked or other proximately located relative to the illustrated intermediate processing station 43.

Preferably, with the ability of the take-out plate 36 to retain performs for at least the majority of one molding cycle and preferably more than one cycle, the system of the present invention can attain cycle time benefits over existing systems since the efficiency of scheduling that results from use of a multi-axis robot permits the simultaneous or seemingly contiguous execution of different tasks with respect to either different sets of performs held by the take-out plate 36 in one specific set of performs (i.e. mold articles) held by or delivered by the take-out plate 36. The handling flexibility provided by the multi-axis robot 13 generally therefore provides cycle time benefits. Additionally, overall part quality can be improved in instances where the molded article undergoes intermediate or post-mold processing (e.g. aggressive cooling), especially since physical hand-off of the molded article from the take-out plate can be avoided. For example, extended retention of the perform in a take-off holder (e.g. cooling tube 42) eliminates a potential for deformation arising from any hot surface contact (of or between molded articles), which hot surface otherwise generally develops over time by heat migration from the inside of the wall of the plastic molded article to an outside surface thereof. Additional cooling offered by the preferred system of the present invention also reduces physical damage, e.g. scratching, to the preform itself.

Figure 2:
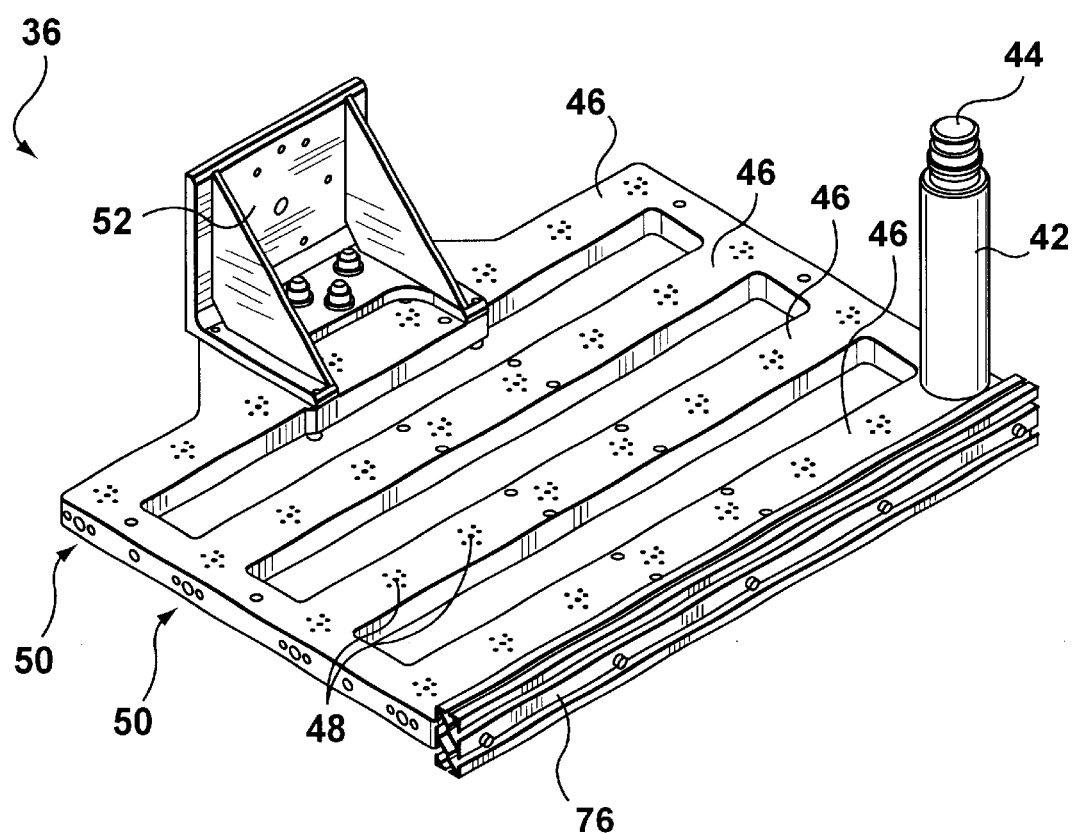
FIG. 2 is a schematic view of a preferred configuration of a take-out plate that is operable in the injection molding system of FIG. 1.

A schematic view of such a take-out plate 36 is represented in FIG. 2. For the sake of clarity, only one of the cooling tubes 42, with a preform 44 received therein, is represented in FIG. 2. The take-out plate 36 comprises, in this exemplary configuration, four columns 46 of connections 48, each column 46 having eight connections 48 for cooling tubes. With the use of a multi-position take-out plate, the connections 48 are arranged in multiple corresponding arrays corresponding in orientation and configuration to the layout of the cavities in the first mold half 14. Considering a two-position take-out plate 36, at the end of each injection cycle, the preforms 44 produced in that cycle are ejected from the cores and received into the cooling tubes 42 of a designated empty set of cooling tubes, while the preforms 44 formed in the previous injection cycle are still retained in the cooling tubes 42 of an earlier utilized set of cooling tubes. The preforms 44 formed in the earlier injection cycle are placed on the arranging station 12 (to be described in detail subsequently) before the end of the next injection cycle, so that the preforms 44 formed in the next injection cycle can be received in the cooling tubes 42 of the now empty set of tubes. This allows for the preforms 44 to be cooled by the cooling tubes for an extended time to improve overall machine cycle time. A connection plate 52 is provided on the take-out plate 36 for connecting the latter to the robot arm 38.

The take-out plate 36 of the present invention is configured as a multi-function plate. As already discussed, the take-out plate 36 firstly acts as a preform removal system to receive preforms ejected from the cores 18 into take-out tubes 42 or holders. To this extent, a first surface of the take-out plate 36 supports the mounting of the take-out tubes 42. In the event that the take-out plate 36 or tubes 42 are fluid cooled, then the take-out plate 36 is channeled to accommodate the supply of cooling fluids; this requires that the take-out plate 36 contains a suitable supply port interface 50. A further function of the take-out plate 36 of the present invention relates to a packing function complementary to the operation of the arranging station 12. The take-out plate of the present invention includes an array of suction pads 76 that, in FIG. 2, are shown on a side end of take-out plate 36 in an orientation perpendicular to the major axis of the cooling tubes 42. The array of suction pads 76 may be realized as individual cups or as strips of elastomeric material that facilitates the production of a good seal between each pad, cup or strip and preforms that are both to be engaged by the suction pad, cup or array and subsequently moved, under suction/vacuum, by the handling robot 13 to a different position. The array of suction pads can be located on any suitable surface, e.g. the parallel underside surface to the take-out tubes 42, of the take-out plate 36. The take-out plate 36 is therefore also configured (e.g. channeled) to support interconnection of a vacuum supply to the array of suction pads 76, which vacuum supply (not shown) is connected through the supply port interface 50, or any another dedicated connection path.

As will be understood, preforms are preferably retained in the take-out tubes 42 under suction, with a closed end of each take-out tube 42 connected to the supply port interface via the respective connections 48.

Of course, the array of suction cups could be located on the robot arm 38 per se, rather than on the take-off plate 36.

Figure 3:
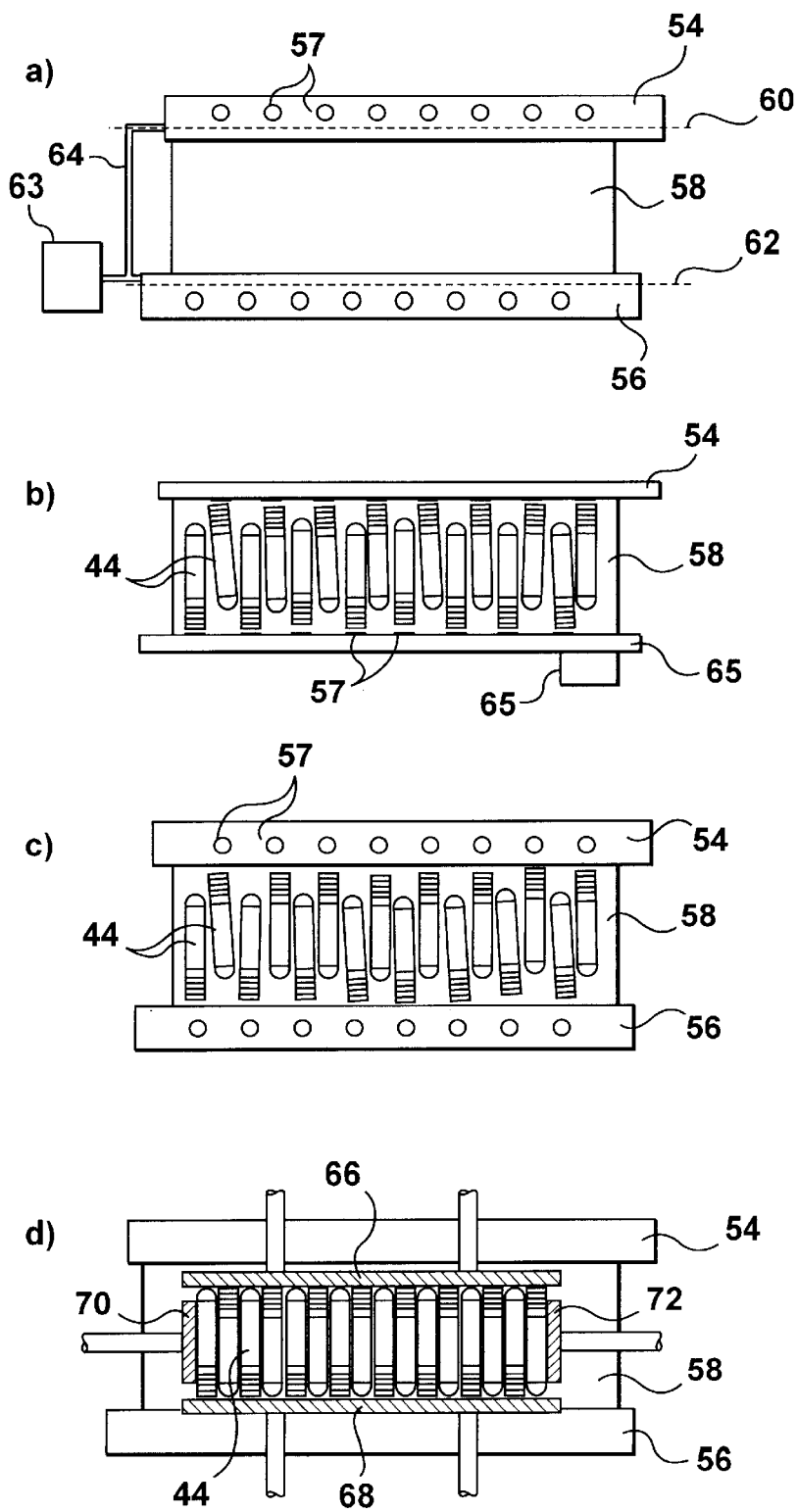
FIG. 3 is a schematic top view of a handling device of a preferred embodiment of the present invention.

A top view of the arranging station 12, to which the preforms 44 are delivered by the take-out plate 36, is illustrated in FIG. 3.

FIG. 3a shows a first longitudinal receiving plate 54, a second longitudinal receiving plate 56 and a support table 58. The first receiving plate 54 and the second receiving plate 56 each have a pivot axis 60, 62 that are substantially parallel to one another. Each receiving plate 54, 56 comprises holders 57, e.g. in the form of pegs or mandrels or recessed cavities, for receiving the open ends of the preforms 44 and initially maintaining them in an upstanding fashion on the receiving plates 54, 56.

By axial re-orientation of the robot arm 38, the preforms 44 are aligned and then placed, essentially upright, with their open ends onto respective holders 57 of the receiving plates 54, 56. Release from the take-out plate 36 can then take place by removing the vacuum and retracting the take-out plate 36. If the preforms on the first receiving plate 54 are not already in a staggered relationship to the preforms 44 on the second receiving plate 56, the first and/or second receiving plates 54, 56 are, in a first embodiment, displaced longitudinally until the preforms are in a staggered relationship; this linear displacement can be accomplished by a rack and pinion driven by a drive unit, such as an electric motor or hydraulic motor. Alternatively, the robot arm 38 can operate to place the preforms 44 on the respective receiving plates 54, 56 in successive movements whereby the set of preforms 44 to be handled are essentially split into two or more groups corresponding to the layouts of the receiving plates 54, 56.

Once the preforms 44 are staggered or interlaced between adjacent receiving plates 54, 56, an actuator 63, such as an electric motor, is then operated to rotate gently the first and second receiving plates 54, 56 about their pivotal axis 60, 62 until the preforms on the first receiving plate 54 and the preforms on the second receiving plate 56 are horizontally arranged side-by-side on support means 58, as shown in FIG. 3b. An actuator may be associated with each receiving plate, alternatively a mechanical linkage 64 may communicate a rotational instruction between adjacent receiving plates. In this way, the actuator 63 causes the tops and bottoms of adjacent preforms to lie side-by-side. The support means for supporting the preforms after they have been released from the holders 57 can e.g. be a support table 58 or support bars. It is to be noted that the use of such support means is not a necessity; it is e.g. possible for the handling robot 13 to place the suction cups 76 of the take-out plate 36 so as to engage the preforms before the latter are released from the holders 57.

After the preforms have been laid down on the support table 58, the preforms are released from the holders 57. In a preferred embodiment, the release mechanism is a motor 65 that operates to retract the pegs into the receiving plates 54, 56, thereby subsequently allowing free movement of the preforms. Alternatively, a pusher bar can be provided for pushing the preforms off the pegs. After the preforms have been released from the holders 57 of the receiving plates 54, 56, the receiving plates 54, 56 can be rotated back into their starting position, as shown in FIG. 3c, to receive the next set of preforms from the take-out plate 36.

The arranging station 12 further comprises alignment means 66, 68, 70, 72 for aligning and/or bringing together the preforms 44 after they have been released from the holders 57 of the receiving plates 54, 56. Such alignment means are shown in FIG. 4d and can comprise a pair of pusher bars 66, 68 for aligning the preforms in their longitudinal direction and a pair of pusher bars 70, 72 for aligning the preforms in their transverse direction. The longitudinal pusher bars 66, 68 may function as release mechanism that removes the preforms 44 from their holders 57. The pusher bars 66, 68, 70, 72 act to bring the preforms closer together and to optimize packing of the preforms top-to-bottom. While the preferred embodiment utilizes two parallel pushers, it will be appreciated that the system could work equally well provided that relative linear movement occurred between a pusher and a fixed (but rotatable) receiving plate. Equally, the same relative movement is all that is necessary for transverse compression of the preform spacing to remove the gaps between adjacent top-to-toe preforms. Once the preforms 44 have been brought into a position as shown in FIG. 3d, they can be transported from the arranging station 12 to a shipping crate 74 or the like. In this respect, the robot arm 38 is once again used. Specifically, the robot arm 38 re-orientates the multi-function take-out plate 36 such that the array of suction pads 76 are aligned above and then brought into contact with the preforms to engage, under suction, and lift the preforms to the designated shipping crate 74. With the preforms initially closely aligned by the pushers, or their function equivalent, of the arranging station, the multi-function take-out plate is able to maintain this desirable tight and efficient packing as the preforms are packed in the crate. Also, beneficially, the use of the handling robot 13 in the packing process ensures that the preforms are placed, rather than dropped, and hence the likelihood of damage to heavyweight preforms is substantially reduced.

Figure 4:
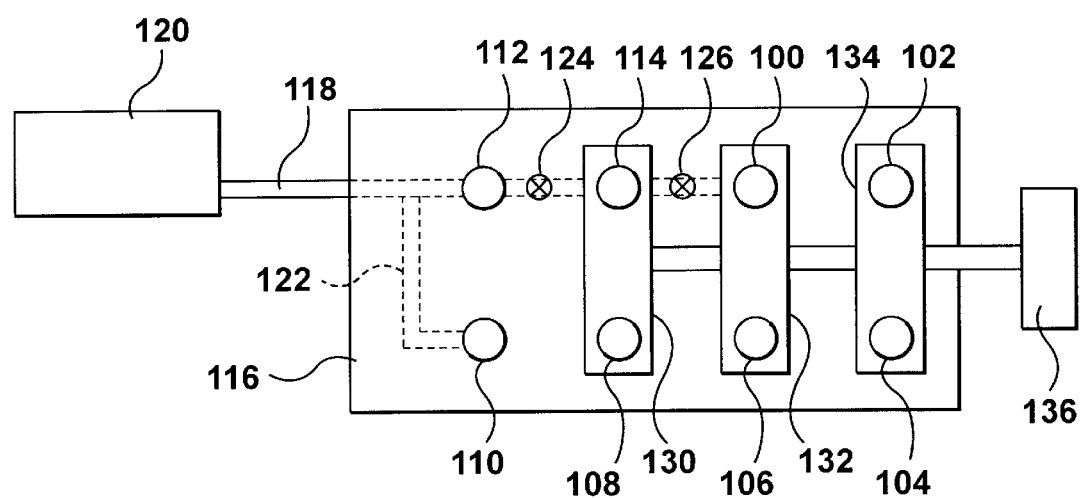
FIG. 4 is an intermediate processing station that can be used in FIG. 1 to facilitate preform orientation.

In another embodiment, the arranging station of FIGS. 1 and 3 can be substituted by an equivalent functional configuration as shown in FIG. 4, which functional configuration can, in fact, be integrated into or otherwise separate from an intermediate cooling station. Specifically, with reference to FIG. 4, the handling device 12 is now realized by an array of hollow pins 100–114 on a plate 116 connected through piping 118, to a switchable cooling fluid supply/vacuum supply 120. Typically, the cooling fluid supply is pressurized, chilled air or the like. In the exemplary array of pins, eight pins are shown. Each of the pins 100–114 is coupled to the air supply/vacuum supply 120 by ducting or tubing 122 that may include strategically located valves 124–126 (only two of which are shown) to allow for the vacuum or pressurized cooling fluid supply to be selectively connected to each hollow pin 100–114.

The array of pins preferably corresponds in layout to the pitch of the cavities of the mold and hence also the layout of the cooling tubes 42. In this way, the take-out plate 36 and robot 13 can operate to deliver all formed preforms onto respectively aligned pins in a one-step process.

In operation, once the preforms are aligned with the respective pins 100–114 (but when the preforms are still retained in their respective take-out tubes 42), the air supply 120 is switched to provide a pressurized stream of cooling fluid into the preforms. For maximum cooling benefit, the pins are introduced into the respective preforms such that cooling fluid can be directed onto internal surfaces of the preform and, most preferably, onto surfaces that are relatively hot and/or which are usually subject to crystallinity problems, e.g. the gate region. Cooling fluid is then allowed to vent from the neck-opening of the preform since the system is preferably an open-system in which the interior of the perform is in direct fluid communication with an ambient environment. With sufficient interior cooling accomplished, the air supply is terminated by the switch energized to engage the vacuum or suction circuit, thereby drawing the performs from the take-out tubes onto the pins 100–114.

With the performs retained on the pins 100–114, the robot 13 can now reposition itself to align its suction pads 76 (shown in FIG. 2) with the performs to withdraw (following curtailment of the vacuum/suction force through the hollow pins that would otherwise retain the preform on the pins 100–114) a first group of performs (not being all the performs). Re-orientation of the robot's arm then permits all remaining preforms to be withdrawn on the suction pads 76. More specifically, the operation of re-orientation allows for preforms from the two aforementioned groups to be orientated head-to-toe (or top-to-bottom) relative to each other. In order that optimum packing can now be performed, a slide mechanism co-operating with the suction pads 76 brings the performs into close contact, thereby removing the pitch separation introduced between preforms during the molding cycle. It will be understood that the slide mechanism can be indexed or geared to ensure optimum space suppression between adjacent preforms. The slide can be realized, for example, by a hydraulic, pneumatic or piston-operated activation device, as will be readily appreciated.

Alternatively, to avoid increasing the weight of the take-out plate 36, the pins 100–114 can be mounted on slides 130–134 that are responsive to an actuator 136, thereby causing (in a group selective basis) specific slides to move together. In operation, slide compression will generally operate at least once during one cycle. In other words, there is relative movement between the array of pins 100–114 that reduces center-line displacement between preforms, with the robot controlled to initially remove a first number of preforms and then to be re-orientated through 180° to permit the removal of the remaining preforms into designated suction cups 76, e.g. alternately spaced suction cups not currently holding a preform.

It is also contemplated that in order to avoid the use of a relatively complex slide and actuation arrangement, strict suction control could be applied to both the array of pins 100–114 and the suction pads 76 on the take-out plate. In this way, the robot arm and specifically its suction pads pick selected preforms from pins 100–114, whereafter the robot re-positions the take-out plate 36 to suppress center-line displacement between preforms held on the suction pads 76 of the multi-function take-out plate, and then to pick other perform(s) from the respective pins 100–114. As necessary, the robots also undergoes 180° inversion to cause close top-to-bottom alignment of the performs along the length of the side of the take-out plate supporting the suction pads 76. Over time, therefore, the suction pads are filled with appropriately spaced, appropriately aligned and appropriately orientated preforms, which preforms can then be placed, preferably by the robot 13, into a crate for shipping in a logistically optimized fashion.

To account for the successive placement of sets of preforms into the crate 74, the handling robot 13 can be fitted with an optical or pressure sensor (not shown) to ensure soft placement of sets of preforms either in successive layers and/or side-by-side.

While the head-to-toe packing of adjacent preforms provides an optimum solution that address the problem of curvature and, more generally, the varying diameter of heavyweight preforms in a transit packing environment, it is perceived that the present invention may extend to sub-optimal systems in which, for example, two adjacent heavyweight preforms are orientated identically, whereas the next adjacent pair of heavyweight preforms are orientated in an opposite (180° reversed) direction to mitigate the aforementioned curvature and diameter issues arising with transit packing of such large preforms.

It will of course be understood that, although the above description is concerned with the handling and packing of multiple, large or heavyweight preforms produced in a single cycle, the system of the present invention is applicable to the handling of smaller preforms and, indeed, any molded elongate articles that are physically dimensioned to an extend where efficient and/or damage-free transit packing is encountered when employing a randomly orientated packing philosophy. Also, while the preferred embodiment of FIG. 3 has been described in relation to a two parallel receiving plate system, the present invention can be extended to multiple parallel receiving plates to accommodate take-out plate layouts and differing mold cavitation configurations.

What is claimed is:

1. A handling device for handling molded articles comprising an arranging station;
    said arranging station comprising:
        a first longitudinal receiving plate for receiving, in use, a first end of at least one article;
        said first receiving plate including at least one holder for holding said at least one article on said first receiving plate, and said first receiving plate having a first pivot axis;
        a second longitudinal receiving plate for receiving, in use, a first end of at least one article;
        said second receiving plate including at least one holder for holding said at least one article on said second receiving plate, and said second receiving plate having a second pivot axis substantially parallel to said first pivot axis; and
        an actuator for pivoting said first and second receiving plates about their respective pivot axis so as to bring said articles side-by-side in a linear array between said receiving plates.

2. The handling device according to claim 1, further including multiple first and second sets of receiving plates.

3. The handling device according to claim 1, wherein said first receiving plate includes a plurality of said first holders that are arranged in a row along said first receiving plate for receiving a first row of articles, and
    said second receiving plate includes a plurality of said second holders that are arranged in a row along said second receiving plate for receiving a second row of articles, and
    said holders are arranged on respective receiving plates such that when, in use, said articles are placed on said holders, a gap of at least the width of an article exists between adjacent articles.

4. The handling device according to claim 1, wherein said arranging station further comprises means for longitudinally displacing one receiving plate with respect to the other.

5. The handling device according to claim 1, wherein said holders are pegs mounted on said receiving plates, said pegs being dimensioned so as to engage said end of said articles.

6. The handling device according to claim 1, wherein said arranging station further comprises release means for releasing said articles from said holders.

7. The handling device according to claim 6, wherein said release means are pusher means for pushing said articles off said holders.

8. The handling device according to claim 6, wherein said release means are means for retracting said holders into said receiving plates.

9. The handling device according to claim 6, wherein said arranging station further comprises support means for supporting said articles after they have been released from said receiving plates.

10. The handling device according to claim 6, wherein said arranging station further comprises alignment means for aligning and/or bringing together said articles after they have been released from said receiving plates.

11. The handling device according to claim 1, further comprising a robot for transferring, in use, said articles from a mold of said molding machine to said receiving plates.

12. The handling device according to claim 11, wherein said robot comprises:
- a take-out plate for receiving said articles from said mold; and
- a robot arm for operating said take-out plate so as to transfer said articles from said mold onto said first and second holders on said receiving plates.

13. The handling device according to claim 12, wherein said take-out plate further comprises take-out tubes for receiving said molded articles therein.

14. The handling device according to claim 13, wherein said take-out plate further comprises cooling means for cooling said articles.

15. The handling device according to claim 13, wherein said robot further comprises transport means for transporting said articles, arranged side-by-side, to a shipping crate or the like.

16. The handling device according to claim 15, wherein said transport means comprises suction means arranged on said take-off plate.

17. The handling device according to claim 1, wherein said articles are large injection molded preforms, said preforms having a weight of at least 100 g, a length of at least 20 cm and a diameter of at least 5 cm.

18. An apparatus for handling molded articles comprising:
- a robotic transfer device that includes a first handling means thereon for, in use, receiving said molded articles in an array from a mold and transferring said array of molded articles to an arranging station, said mold having a pitch separation; and
- said arranging station which comprises:
  - means for receiving and aligning a first set of articles of said array;
  - means for receiving and aligning a second set of articles of said array;
  - means for grouping said first set and said second set of articles together in a linear array, said means for grouping being arranged to permit the pitch separation between adjacent articles to be reduced; and
- said robotic transfer device further comprises:
  - a second handling means thereon that is configured for receiving, in use, said linear array from said arranging station and thereafter delivering and depositing said molded articles.

19. The handling device according to claim 18, further including means for receiving and aligning a plurality of said first and second sets of molded articles.

20. The handling device according to claim 18, wherein the means for receiving and aligning the first and second set of molded articles are pins extending from a first and a second receiving plate respectively.

21. The handling device according to claim 20, wherein the pins are hollow pins that are selectively connected, in use, to a source of cooling fluid.

22. The handling device according to claim 18, wherein the means for transferring the array is a take-out plate including a plurality of take-out holders.

23. The handling device according to claim 22, wherein the take-out plate has the transport means located adjacent thereto.

24. The handling device according to claim 22, wherein the take-out plate includes at least twice the number of take-out holders as there are injection molded articles produced during each cycle of the injection molding machine.

25. The handling device according to claim 22, said means for transferring includes a robot that rotates, in use, the take-out plate to cause opposite longitudinal orientation of said second set of articles relative to said first set of articles on said transport means.

26. The handling device according to claim 18, wherein said arranging station further includes means for orientating said second set of articles relative to said first set of articles such that said second set of articles are orientated in an opposing direction to said first set of articles.

27. A method for handling molded articles comprising the steps of:
- receiving said articles in a take-out plate and operating said take-out plate so as to place at least one article onto a first longitudinal receiving plate and at least one article onto a second longitudinal receiving plate, said first and second receiving plates each comprising at least one holder for holding said articles on said receiving plates, said first and second receiving plates having substantially parallel pivot axis; and
- pivoting said first and second receiving plates about their respective pivot axis, said first and second receiving plates being pivoted so as to bring said articles side-by-side between said receiving plates in a linear array.

28. A method for handling molded articles using a robot supporting a multi-function take-out plate, the molded articles formed in a multi-cavity mold having a first pitch separation between adjacently molded articles, the method comprising:
- using the take-out plate to remove and transfer an array of molded articles from the mold;
- placing a plurality of sets of molded articles of said array onto a plurality of sets of pins; and
- manipulating the robot arm in a sequence to pick up the molded articles from the plurality of sets of pins in a linear array for subsequent delivery and deposition, the linear array of molded articles on the robot having a reduced pitch separation between adjacent injection molded articles relative to the first pitch separation in the mold.

29. The method of claim 28, wherein the step of placing the plurality of sets of molded articles occurs after repositioning of the take-out plate by the robot.

30. The method of claim 28, further comprising proactively cooling the molded articles during at least one of:
- the transfer of the molded articles from the mold; and
- location of the molded articles on the pins.

31. A handling device for handling molded articles comprising an arranging station;
- said arranging station comprising:
  - a support table;
  - a first longitudinal receiving plate pivotably mounted to said support table about a first pivot axis that is substantially parallel to a longitudinal axis of said first receiving plate;
  - a first holder arranged on said first receiving plate for holding, in use, an end of a first molded article on said first receiving plate;
  - a second longitudinal receiving plate pivotably mounted to said support table about a second pivot axis that is substantially parallel to both a longitudinal axis of said second receiving plate and said first pivot axis;

a second holder arranged on said second receiving plate for holding, in use, an end of a second molded article on said second receiving plate;

said first and second receiving plates being pivotable about said first and second pivot axes, respectively, between a loading position and an interlacing position;

said first and second receiving plates being mutually positioned on said support table to include a spacing therebetween that is sufficient to at least partially interlace, in use, said first and second molded articles when said first and second receiving plates are in their interlacing position, and wherein said first and second holders, located thereon, are arranged in a staggered relation to the extent that a longitudinal gap of at least the width of an article exists therebetween;

an actuator for pivoting said first and second receiving plates about their respective pivot axis so as to bring said articles side-by-side in a linear array between said receiving plates; and a means for releasing said articles from said first and second holders.

32. The handling device according to claim 31, further including multiple first and second sets of receiving plates.

33. The handling device according to claim 31, wherein said first receiving plate includes a plurality of said first holders that are arranged in a row along said first receiving plate for receiving a first row of articles;

said second receiving plate includes a plurality of said second holders that are arranged in a row along said second receiving plate for receiving a second row of articles; and said holders are arranged on respective receiving plates such that when, in use, said articles are placed on said holders, a gap of at least the width of an article exists between adjacent articles.

34. The handling device according to claim 31, wherein said arranging station further comprises means for longitudinally displacing one receiving plate with respect to the other such that the first and second holders may be mutually aligned mutually aligned for receiving molded articles simultaneously.

35. The handling device according to claim 31, wherein said holders are pegs mounted on said receiving plates, said pegs being dimensioned so as to engage said end of said articles.

36. The handling device according to claim 31, wherein said release means are pusher means for pushing said articles off said holders.

37. The handling device according to claim 31, wherein said release means are means for retracting said holders into said receiving plates.

38. The handling device according to claim 31, wherein said arranging station further comprises support means for supporting said articles after they have been released from said receiving plates.

39. The handling device according to claim 31, wherein said arranging station further comprises alignment means for aligning and/or bringing together said articles after they have been released from said receiving plates.

40. The handling device according to claim 31, further comprising a robot for transferring, in use, said articles from a mold of said molding machine to said receiving plates.

41. The handling device according to claim 40, wherein said robot comprises:

a take-out plate for receiving said articles from said mold; and a robot arm for operating said take-out plate so as to transfer said articles from said mold onto said first and second holders on said receiving plates.

42. The handling device according to claim 41, wherein said take-out plate further comprises take-out tubes for receiving said freshly molded articles therein.

43. The handling device according to claim 41, wherein said take-out plate further comprises cooling means for cooling said articles.

44. The handling device according to claim 41, wherein said robot further comprises transport means for transporting said articles, arranged side-by-side, to a shipping crate or the like.

45. The handling device according to claim 44, wherein said transport means comprises suction means arranged on said take-off plate.

46. The handling device according to claim 31, wherein said articles are large injection molded preforms, said preforms having a weight of at least 100 g, a length of at least 20 cm and a diameter of at least 5 cm.

* * * * *